United States Patent [19]

Livingston

[11] Patent Number: 4,946,221
[45] Date of Patent: Aug. 7, 1990

[54] INFANT SEAT COVER

[76] Inventor: Isabel C. Livingston, R.D. 2, Box 134B, Hudson, N.Y. 12534

[21] Appl. No.: 170,880

[22] Filed: Mar. 21, 1988

[51] Int. Cl.⁵ .............................................. A47C 7/66
[52] U.S. Cl. ...................................... 297/184; 5/416; 297/224
[58] Field of Search ............... 297/229, 219, 184, 224; 5/494, 497, 416

[56] References Cited

U.S. PATENT DOCUMENTS

| | | | |
|---|---|---|---|
| 1,732,878 | 10/1929 | Collender | 5/416 |
| 1,770,841 | 7/1930 | Clyman | 5/416 |
| 1,897,525 | 2/1933 | McGill | 297/184 |
| 2,191,956 | 2/1940 | Coldren | 297/224 |
| 2,546,843 | 3/1951 | Zigterman | 5/416 |
| 2,590,664 | 3/1952 | Weaklend | 297/219 |
| 2,735,716 | 2/1956 | Shimabukuro | 5/416 |
| 3,254,348 | 6/1966 | Di Addario | 5/497 |
| 3,799,608 | 3/1974 | Smutny et al. | 297/184 |
| 3,873,117 | 3/1975 | Perego | 297/184 |
| 4,314,727 | 2/1982 | Potts | 297/184 |

FOREIGN PATENT DOCUMENTS

| | | | |
|---|---|---|---|
| 2614594 | 3/1977 | Fed. Rep. of Germany | 297/184 |
| 1511646 | 12/1967 | France | 297/219 |

Primary Examiner—Francis K. Zugel
Attorney, Agent, or Firm—Charles J. Brown

[57] ABSTRACT

For use with an upwardly open infant seat in which an infant reclines, a removable pliable water-repellent cover adapted to extend loosely and continuously over the entire seat except for a central face opening and having a peripheral elastic element for releaseably encircling the seat to hold the cover in place, the cover being entirely without rigid framing of its own.

1 Claim, 1 Drawing Sheet

INFANT SEAT COVER

BACKGROUND OF THE INVENTION

Infant car seat covers have been known for at least half a century as evidenced by U.S. Pat. No. 1,217,474 which discloses a rather complicated framed design. More recent forms include those shown in U.S. Pats. Nos. 4,314,727 and 4,579,385, both of which are for self-supporting housings enclosing the infant, and in U.S. Pat. No. 4,583,779 which discloses a sun shade canopy stiffened with rods. Strollers have also been provided with covers, such as the tie-on transparent sheet of U.S. Pat. No. 2,734,716 and the elastically hemmed insect netting of U.S. Pat. No. 1,732,878.

It is the principal purpose of the present invention to improve upon those and other prior art designs by providing a cover for an infant seat, typically a car seat, which loosely covers all of the infant except for the face and which is entirely without rigid framing of its own so that it can be folded into compact form when not in use. Face openings for cape-type articles of clothing are conventional, such as the infant's garment of U.S. Pat. No. 2,227,751, but it is believed that face openings have not been incorporated previously in a frameless water-repellent cover adapted to be removably attached over an infant seat.

SUMMARY OF THE INVENTION

The invention provides a removable cover for use with an infant seat, such as a car seat, having an upwardly open rigid frame within which an infant reclines facing outwardly. The cover of the invention includes a body of pliable water-repellent material assembled from edge-joined sections in non-planar form. This body includes a peripheral portion adapted to fit over and around the seat frame and a hem forming a casing along at least a substantial part of that peripheral portion. The body also includes a central portion adapted to extend continuously and loosely over the entire open frame except for a face opening adapted to register with the face of the reclining infant. Also included in the cover is an elastic element fitted within the peripheral casing to releasably grip the frame. The cover is entirely without rigid framing of its own separate from the seat with which it is used and hence can be folded into compact form when not in use.

In a preferred form the central portion of the body of the cover includes a puffed frontal portion adapted to fit particularly loosely over the legs of the reclining infant. A peak element may be provided projecting from that edge of the face opening adapted to extend across the forehead of the reclining infant. The cover material is preferably of washable fabric and the elastic element is preferably in the form of a closed loop adapted to encircle the seat frame. The peripheral hem is continuous but the casing may be discontinuous to define cut-outs through which a seat belt may be directed.

DESCRIPTION OF PREFERRED EMBODIMENT

Figure 1:
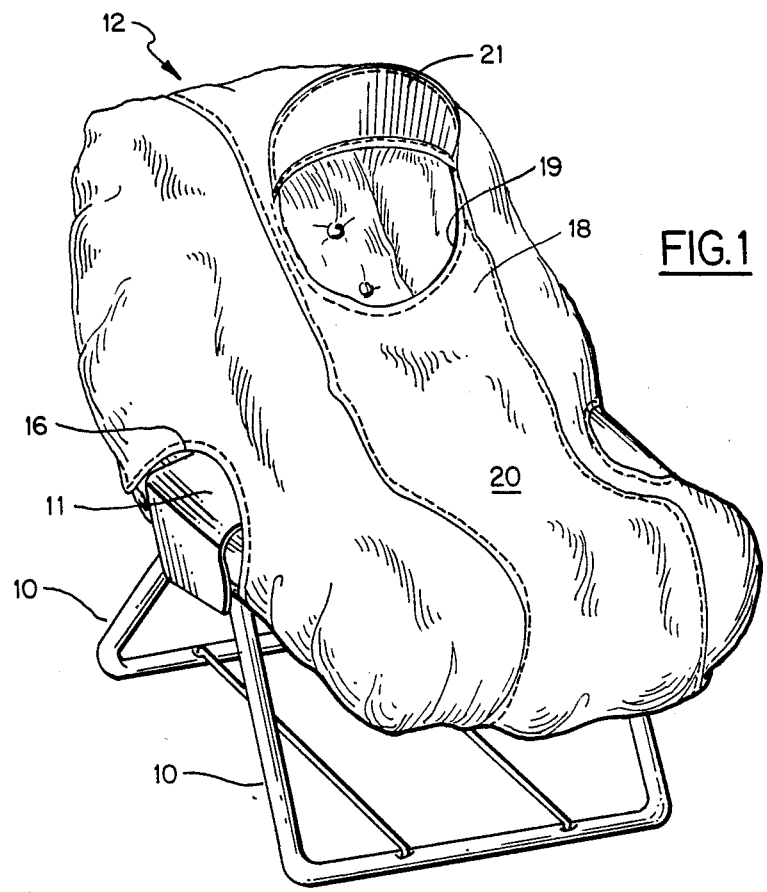
FIG. 1 is a perspective view of the cover of the invention mounted on an infant car seat and viewed generally from the front.

A typical infant car seat includes rigid legs 10 and arm rests 11 extending from a padded seat which is not visible in the drawings. A conventional vehicle lap belt (not shown) may be tightened across the arm rests 11 to hold the seat securely in place. Such a seat is commonly adjustable so that the back is more upright when the infant is in an automobile, but lower when the seat is free-standing and used for sleeping or in an intermediate position for feeding. The principal purpose of the cover of the invention is to provide a compact frameless article which can be readily unfolded and snapped over the seat to protect the infant against the elements when being carried in the seat to and from a vehicle or elsewhere. At the same time it is intended that the cover not fully enclose the infant but rather leave the infant's face exposed to permit easy breathing and visibility by and of the infant.

Figure 2:
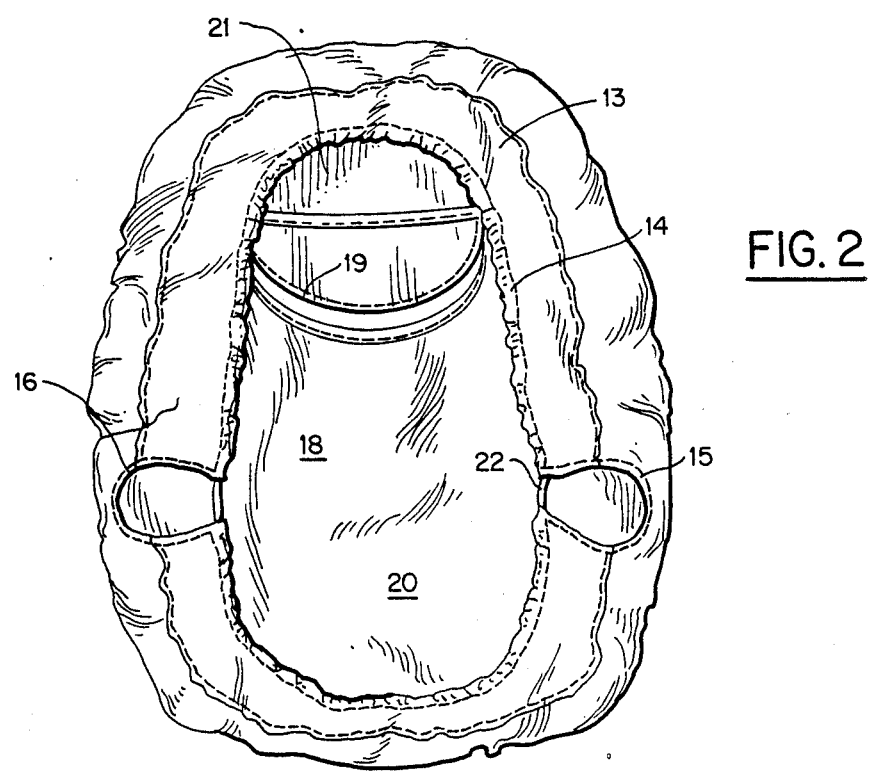
FIG. 2 is a rear view of the cover of the invention removed from the car seat.

The removable cover of the invention includes a body 12 which is made of water-repellent washable fabric. The body 12 is assembled from edge-joined sections stitched together as shown in the drawings to be in other than flat form, which is to say non-planar. The particular patterns of stitched sections is a matter of choice. The sections include a peripheral portion 13, seen in the rear view of FIG. 2, which is adapted to fit around the seat frame. A hem forms a casing 14 along substantially the entire length of the peripheral portion 13. As seen in FIG. 2 that hem is continuous but the casing is discontinuous to define cut-outs 15 and 16 which fit around the arm rests 11 of the seat cover as seen in FIG. 1. This leaves the arm rests 11 uncovered but fitted snugly about by the cover 12 and allows a vehicle lap belt to be directed over the arm rests through the cut-outs 15 and 16.

A central portion 18 of the cover 12 is adapted to extend continuously and loosely over the entire open frame of the car seat except for a face opening 19 adapted to register with the face of the reclining infant. The central portion 18 includes a puffed frontal portion 20 adapted to fit particularly loosely over the legs of the reclining infant to allow freedom of movement. The central portion 18 also includes a peak element 21 projecting from that edge of the face opening 19 adapted to extend across the forehead of the reclining infant.

A closed-loop elastic element 22 is fitted within the peripheral casing 14 and drawn the peripheral portion together in its relaxed state as shown in FIG. 1 to a nominal circumference smaller than the overall dimensions of the car seat. When the elastic element is stretched it can be fitted about the car seat as shown in FIG. 1 to hold the cover 12 removably in place.

The cover 12 is entirely without rigid framing of its own separate from the seat with which it is used and may therefore be folded into a compact form when not in use.

It is important in this design that a complete water-repellent enclosure is provided for an infant reclining in a car seat but which loosely covers the infant to allow maximum freedom of movement and, more importantly, which leaves the face of the infant uncovered for ease of breathing and visibility. Very few of the covers of the prior art for infant car seats or strollers are without rigid framing and it is believed that those which are completely cover the infant with transparent sheeting or netting. The present invention is characterized by combining the features of loosely covering all but the infant's face and at the same time being devoid of rigid framing, as set forth in the following claims which are to determine the scope of the invention.

I claim:

1. For use with an infant car seat having an upwardly open rigid frame within which an infant reclines facing outwardly, a removable cover separate from said seat and frame comprising
   (a) a body of pliable material assembled from edge-joined sections in non-planar form and including
      i. a peripheral portion adapted to fit over and around the seat frame,
      ii. a hem forming a casing along substantially all of the peripheral portion,
      iii. the hem being continuous and the casing being discontinuous to define cut-outs through which a lap belt may be directed, and
      iv. a central portion adapted to extend continuously and loosely over the entire upwardly open frame and the infant reclining therein except for a face opening adapted to register with the face of the reclining infant,
      v. the central portion including a puffed frontal portion adapted to fit particularly loosely over the legs of the reclining infant,
      vi. the central portion also including a peak element projecting from that edge of the face opening adapted to extend across the forehead of the reclining infant; and
   (b) a closed-loop elastic element fitted within the peripheral casing to releasably grip the frame;
   (c) said cover being entirely without rigid framing of its own separate from the seat with which it is used and hence being foldable into compact form when not in use;
   (d) said cover being entirely without elements fastened about any part of the infant's body including the head and hence allowing maximum freedom of movement for the infant.

* * * * *